United States Patent
Iwata et al.

(10) Patent No.: US 7,058,741 B2
(45) Date of Patent: Jun. 6, 2006

(54) SYSTEM FOR SUSPENDING PROCESSING BY A FIRST ELECTRONIC DEVICE ON A DATA LINE TO ALLOW A SECOND ELECTRONIC DEVICE TO USE THE DATA LINE, WITH SUBSEQUENT RESUMPTION OF THE PROCESSING OF THE FIRST ELECTRONIC DEVICE

(75) Inventors: Kazuya Iwata, Katano (JP); Tatsuya Adachi, Neyagawa (JP); Tetsushi Kasahara, Katano (JP); Seiji Nakamura, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 80 days.

(21) Appl. No.: 10/485,492

(22) PCT Filed: Jul. 29, 2002

(86) PCT No.: PCT/JP02/07695

§ 371 (c)(1),
(2), (4) Date: Mar. 10, 2004

(87) PCT Pub. No.: WO03/014947

PCT Pub. Date: Feb. 20, 2003

(65) Prior Publication Data

US 2005/0005048 A1    Jan. 6, 2005

(30) Foreign Application Priority Data

Aug. 2, 2001  (JP) ............................. 2001-234665

(51) Int. Cl.
*G06F 13/00* (2006.01)
*G06F 9/00* (2006.01)

(52) U.S. Cl. .......................... 710/110; 710/5; 710/105; 710/107; 712/228; 714/15

(58) Field of Classification Search ................ 710/110, 710/107, 244, 240, 40, 243, 260, 262, 48, 710/52, 5, 105; 712/219, 233, 242, 31, 228; 718/106; 711/151, 169; 709/208; 714/15
See application file for complete search history.

(56) References Cited

U.S. PATENT DOCUMENTS 5,526,498 A * 6/1996 Matsuo et al. .............. 712/239
(Continued)

FOREIGN PATENT DOCUMENTS

EP    0 576 764 A1    1/1994
(Continued)

OTHER PUBLICATIONS

"Register organization for enhanced on-chip parallelism" by Sangireddy, R (abstract only) Publication Date: 2004.*

*Primary Examiner*—Gopal C. Ray
(74) *Attorney, Agent, or Firm*—Akin Gump Strauss Hauer & Feld, LLP

(57) ABSTRACT

To provide a method for controlling a transmission system with quick response in which plural electronic devices are connected to one host apparatus through a common data line. The method for controlling the transmission system of the present invention comprises: a step of transmitting a command signal for releasing the data line and suspending the processing through a command signal line to the electronic device occupying the data line in the state where one of the plural electronic devices is executing the processing that occupies the data line so as to make the electronic device release the data line and suspend the processing and to perform data transmission between the host apparatus and the other one of the electronic devices; and a step of resuming the suspended processing after the data transmission between the host apparatus and the other electronic device.

9 Claims, 9 Drawing Sheets

U.S. PATENT DOCUMENTS 5,530,903 A * 6/1996 Calvignac et al. ............ 710/41
5,546,548 A * 8/1996 Chen et al. ................. 710/116
5,884,085 A * 3/1999 Sakai et al. ................. 713/300
6,006,363 A * 12/1999 Karlin .......................... 2/228

FOREIGN PATENT DOCUMENTS

| | | |
|---|---|---|
| JP | 60-79456 A | 5/1985 |
| JP | 62-237560 A | 10/1987 |
| JP | 1-206446 A | 8/1989 |
| JP | 5-134980 A | 6/1993 |
| JP | 5-151143 A | 6/1993 |
| JP | 5-151147 A | 6/1993 |
| JP | 6-35849 A | 2/1994 |
| JP | 8-249269 A | 9/1996 |
| JP | 11-65994 A | 3/1999 |

* cited by examiner

SYSTEM FOR SUSPENDING PROCESSING BY A FIRST ELECTRONIC DEVICE ON A DATA LINE TO ALLOW A SECOND ELECTRONIC DEVICE TO USE THE DATA LINE, WITH SUBSEQUENT RESUMPTION OF THE PROCESSING OF THE FIRST ELECTRONIC DEVICE

TECHNICAL FIELD

The present invention relates to a host apparatus, electronic devices, and a method for controlling a transmission system having a host apparatus and electronic devices.

BACKGROUND ART

There is a transmission system in which a host apparatus (master apparatus) is connected to plural electronic devices (slave devices) through a common data line and data is transmitted between the host apparatus and the plural electronic devices.

In such transmission system, generally, the host apparatus permits a specific electronic device to occupy a data line and then data transmission between the host apparatus and the electronic device (data transmission from the host apparatus to the electronic device or data transmission from the electronic device to the host apparatus) is executed. When the data transmission is completed, the host apparatus permits another electronic device to occupy the data line and then data transmission between the host apparatus and the electronic device is executed.

However, in the conventional transmission system in which plural electronic devices are connected to one host apparatus through the common data line (for example, data bus), while one electronic device is occupying the data line, data transmission between other electronic device and the host apparatus cannot be executed. The other electronic device is obliged to wait until the initial electronic device has finished processing (including data transmission) and then execute data transmission.

To solve the above-mentioned conventional problem, the present invention intends to provide a transmission system with quick response, wherein even while one electronic device is occupying a data line, data transmission between the other electronic device and the host apparatus can be performed as necessary and plural electronic devices are connected to one host apparatus through a common data line, a method for controlling the transmission system, and a host apparatus and electronic devices constituting the transmission system.

DISCLOSURE OF THE INVENTION

To solve the above-mentioned problem, the present invention has the following configuration.

A host apparatus from one aspect of the present invention comprises an input/output part having a command signal line for transmitting a command signal from the host apparatus to an electronic device and a response signal from the above-mentioned electronic device to the host apparatus in response to the above-mentioned command signal, and a data line, at least a part of which is commonly used by plural electronic devices and connected to the plural electronic devices, for transmitting, at least, data in connection with the command signal from the host apparatus to the above-mentioned electronic device; and a control part having a saving register for bus release, and the above-mentioned control part in the state where one of the above-mentioned electronic devices is executing the processing that occupies the above-mentioned data line, when data transmission between the host apparatus and the other one of the above-mentioned electronic devices is intended to be executed, transmits a command signal for releasing the above-mentioned data line and suspending the above-mentioned processing to the electronic device that occupies the above-mentioned data line through the above-mentioned command signal line;

stores an identifier of the electronic device that occupies the above-mentioned data line and the information on the current stage of the above-mentioned processing in the above-mentioned saving register for bus release;

after completion of data transmission between the host apparatus and the above-mentioned other electronic device, reads out the identifier of the electronic device that had occupied the above-mentioned data line and the information on the current stage of the above-mentioned processing from the above-mentioned saving register for bus release; and transmits a command signal for returning to the above-mentioned suspended processing to the electronic device that had occupied the above-mentioned data line through the above-mentioned command signal line.

A host apparatus from another aspect of the present invention comprises an input/output part having a command signal line for transmitting a command signal from the host apparatus to an electronic device and a response signal from the above-mentioned electronic device to the host apparatus in response to the above-mentioned command signal, and a data line, at least a part of which is commonly used by plural electronic devices and connected to the plural electronic devices, for transmitting, at least, data in connection with the command signal from the host apparatus to the above-mentioned electronic device; and a control part having a saving register for bus release, and the above-mentioned control part in the state where one of the above-mentioned electronic devices is executing the processing that occupies the above-mentioned data line, when data transmission between the host apparatus and the other one of the above-mentioned electronic devices is intended to be executed, transmits a command signal for releasing the above-mentioned data line and suspending the above-mentioned processing to the above-mentioned plural electronic devices connected to the above-mentioned data line through the above-mentioned command signal line;

stores the information that the above-mentioned data line has been released and the information on the current stage of the above-mentioned processing in the above-mentioned saving register for bus release;

after completion of data transmission between the host apparatus and the above-mentioned other electronic device, reads out the information that the above-mentioned data line has been released and the information on the current stage of the above-mentioned processing from the above-mentioned saving register for bus release; and transmits a command signal for returning to the above-mentioned suspended processing to the above-mentioned plural electronic devices connected to the above-mentioned data line through the above-mentioned command signal line.

In the above-mentioned host apparatus from another aspect of the present invention, the above-mentioned input/output part further has an interrupt signal line for transmitting an interrupt signal from the above-mentioned electronic device to the host apparatus;

the above-mentioned control part further has an interrupt priority determination part;

in the case where the host apparatus receives the interrupt signal for requesting data transmission from the other one of the above-mentioned electronic devices through the above-mentioned interrupt signal line in the state where one of the above-mentioned electronic devices is executing the processing that occupies the above-mentioned data line; and the above-mentioned interrupt priority determination part determines that the above-mentioned data transmission has a higher priority than the processing that occupies the above-mentioned data line, there is a case where data transmission between the host apparatus and the above-mentioned other electronic device is intended to be executed in the state where one of the above-mentioned electronic devices is executing the processing that occupies the above-mentioned data line.

The above-mentioned electronic device from another aspect of the present invention comprises an input/output part having a command signal line for transmitting a command signal from the host apparatus to an electronic device and a response signal from the above-mentioned electronic device to the host apparatus in response to the above-mentioned command signal, and a data line, at least a part of which is commonly used by plural electronic devices and connected to the plural electronic devices, for transmitting, at least, data in connection with the command signal from the host apparatus to the above-mentioned electronic device; and a control part having a saving register for bus release, and the above-mentioned control part in the state where the electronic device is executing the processing that occupies the above-mentioned data line, when receiving a command signal for releasing the above-mentioned data line and suspending the above-mentioned processing from the above-mentioned host apparatus, stores the information on the current stage of the above-mentioned processing in the above-mentioned saving register for bus release, suspends the above-mentioned processing and transmits a response signal for notifying that the above-mentioned processing has been suspended and the above-mentioned data line has been released to the above-mentioned host apparatus through the above-mentioned command signal line;

when receiving a command signal for returning to the above-mentioned suspended processing from the above-mentioned host apparatus through the above-mentioned command signal line, transmits a response signal including the information that return of the above-mentioned processing is possible and the information as to whether the data line need to be reoccupied or not to the above-mentioned host apparatus through the above-mentioned command signal line, reads out the information on the current signal of the above-mentioned processing from the above-mentioned saving register for bus release, resumes the above-mentioned processing from the above-mentioned stage, and if there is need to reoccupy the above-mentioned data line, transmits data through the above-mentioned data line.

A method for controlling a transmission system from another aspect of the present invention comprises a host apparatus, plural electronic devices, a command signal line for transmitting a command signal from the host apparatus to an electronic device and a response signal from the above-mentioned electronic device to the host apparatus in response to the above-mentioned command signal, and a data line, at least a part of which is commonly used by plural electronic devices and connected to the plural electronic devices, for transmitting, at least, data in connection with the command signal from the host apparatus to the above-mentioned electronic device; and the above-mentioned method comprises the steps of:

in the state where one of the above-mentioned plural electronic devices is executing the processing that occupies the above-mentioned data line, transmitting an command signal for releasing the above-mentioned data line and suspending the above-mentioned processing from the host apparatus to the above-mentioned electronic device that occupies the above-mentioned data line through the above-mentioned command signal line in order to execute data transmission between the above-mentioned host apparatus and the other one of the above-mentioned electronic devices;

transmitting a response signal for notifying that the above-mentioned processing has been suspended and the above-mentioned data line has been released from the electronic device that occupies the above-mentioned data line to the above-mentioned host apparatus through the above-mentioned command signal line;

after completion of data transmission between the above-mentioned host apparatus and the above-mentioned other electronic device, transmitting an command signal for returning to the above-mentioned suspended processing from the host apparatus to the electronic device that had occupied the above-mentioned data line through the above-mentioned command signal line;

transmitting a response signal including the information that return of the above-mentioned processing is possible and the information as to whether the data line need to be reoccupied or not from the electronic device that had occupied the above-mentioned data line to the above-mentioned host apparatus through the above-mentioned command signal line; and if the electronic device that had occupied the above-mentioned data line need to reoccupy the above-mentioned data line, transmitting data through the above-mentioned data line and resuming the above-mentioned processing.

A method for controlling a transmission system from another aspect of the present invention comprises a host apparatus, plural electronic devices, a command signal line for transmitting a command signal from the host apparatus to an electronic device and a response signal from the above-mentioned electronic device to the host apparatus in response to the above-mentioned command signal, and a data line, at least a part of which is commonly used by plural electronic devices and connected to the plural electronic devices, for transmitting, at least, data in connection with the command signal from the host apparatus to the above-mentioned electronic device; and the above-mentioned method comprises the steps of:

in the state where one of the above-mentioned plural electronic devices is executing the processing that occupies the above-mentioned data line, transmitting an command signal for releasing the above-mentioned data line and suspending the above-mentioned processing from the host apparatus to the above-mentioned plural electronic devices connected to the above-mentioned data line through the above-mentioned command signal line in order to execute data transmission between the above-mentioned host apparatus and the other one of the above-mentioned electronic devices;

transmitting a response signal for notifying that the above-mentioned processing has been suspended and the above-mentioned data line has been released from the electronic device that occupies the above-mentioned data line to the above-mentioned host apparatus through the above-mentioned command signal line;

after completion of data transmission between the above-mentioned host apparatus and the above-mentioned other electronic device, transmitting an command signal for returning to the above-mentioned suspended processing from the host apparatus to the above-mentioned plural electronic devices connected to the above-mentioned data line through the above-mentioned command signal line;

transmitting a response signal including the information that return of the above-mentioned processing is possible and the information as to whether the data line need to be reoccupied or not from the electronic device that had occupied the above-mentioned data line to the above-mentioned host apparatus through the above-mentioned command signal line; and if the electronic device that had occupied the above-mentioned data line need to reoccupy the above-mentioned data line; transmitting data through the above-mentioned data line and resuming the above-mentioned processing.

In a method for controlling the above-mentioned transmission system from another aspect of the present invention, the above-mentioned transmission system further comprises an interrupt signal line for transmitting an interrupt signal from the above-mentioned electronic device to the host apparatus, and the above-mentioned method comprises the steps of:

in the state where one of the above-mentioned electronic devices is executing the processing that occupies the above-mentioned data line, the above-mentioned host apparatus receiving an interrupt signal for requesting data transmission from the other one of the above-mentioned electronic devices through the above-mentioned interrupt signal line; and determining that the above-mentioned data transmission has a higher priority than the processing that occupies the above-mentioned data line; and based on the result of the above-mentioned determination, there is a case where data transmission between the above-mentioned host apparatus and the above-mentioned other electronic device is intended to be executed in the state wherein one of the above-mentioned electronic devices is executing the processing that occupies the above-mentioned data line.

In a method for controlling the above-mentioned transmission system from another aspect of the present invention, the above-mentioned plural electronic devices have an identifier for distinguishing from each other and at least either of the above-mentioned command signal or the above-mentioned response signal has the above-mentioned identifier.

A host apparatus from another aspect of the present invention comprises an input/output part having a communication line for transmitting a command signal from the host apparatus to an electronic device and a response signal from the above-mentioned electronic device to the host apparatus in response to the above-mentioned command signal; and a control part having a saving register, and the above-mentioned control part in the state of performing communication processing with one of the above-mentioned electronic devices, when the host apparatus intends to communicate with the other one of the above-mentioned electronic devices, transmits a command signal for suspending the above-mentioned communication processing to the above-mentioned electronic device through the above-mentioned communication line;

stores an identifier of the above-mentioned electronic device and the information on the current stage of the above-mentioned communication processing in the above-mentioned saving register;

after completion of communication between the host apparatus and the above-mentioned other electronic device, reads out the identifier of the above-mentioned electronic device and the information on the current stage of the above-mentioned communication processing from the above-mentioned saving register; and transmits a command signal for returning to the above-mentioned suspended communication processing to the above-mentioned electronic device through the above-mentioned communication line.

The present invention has an effect of realizing the method for controlling the transmission system wherein, even while one electronic device is occupying the data line, data transmission between the other electronic device and the host apparatus can be executed and plural electronic devices are connected to one host apparatus through the common data line, and a host apparatus and electronic devices constituting the transmission system.

The present invention has an effect that, even while the host apparatus is communicating one electronic device, the host apparatus can suspend the communication and communicate with the other electronic device, if necessary. The host apparatus can resume communicate with the initial electronic device efficiently. This achieves an advantageous effect that a transmission system with quick response in which plural electronic devices are connected to one host apparatus, a method for controlling the system, a host apparatus and electronic devices constituting the transmission system can be realized.

The novel features of the invention are set forth with particularity in the appended claims. The invention as to both structure and content, and other objects and features thereof will best be understood from the detailed description when considered in connection with the accompanying drawings.

Part or All of the drawings are drawn schematically for diagrammatic representation and it should be considered that they do not necessarily reflect relative size and position of components shown therein.

BEST MODE FOR CARRYING OUT THE INVENTION

Embodiments embodying best mode for carrying out the present invention will be described along with drawings.

First Embodiment

Figure 1:
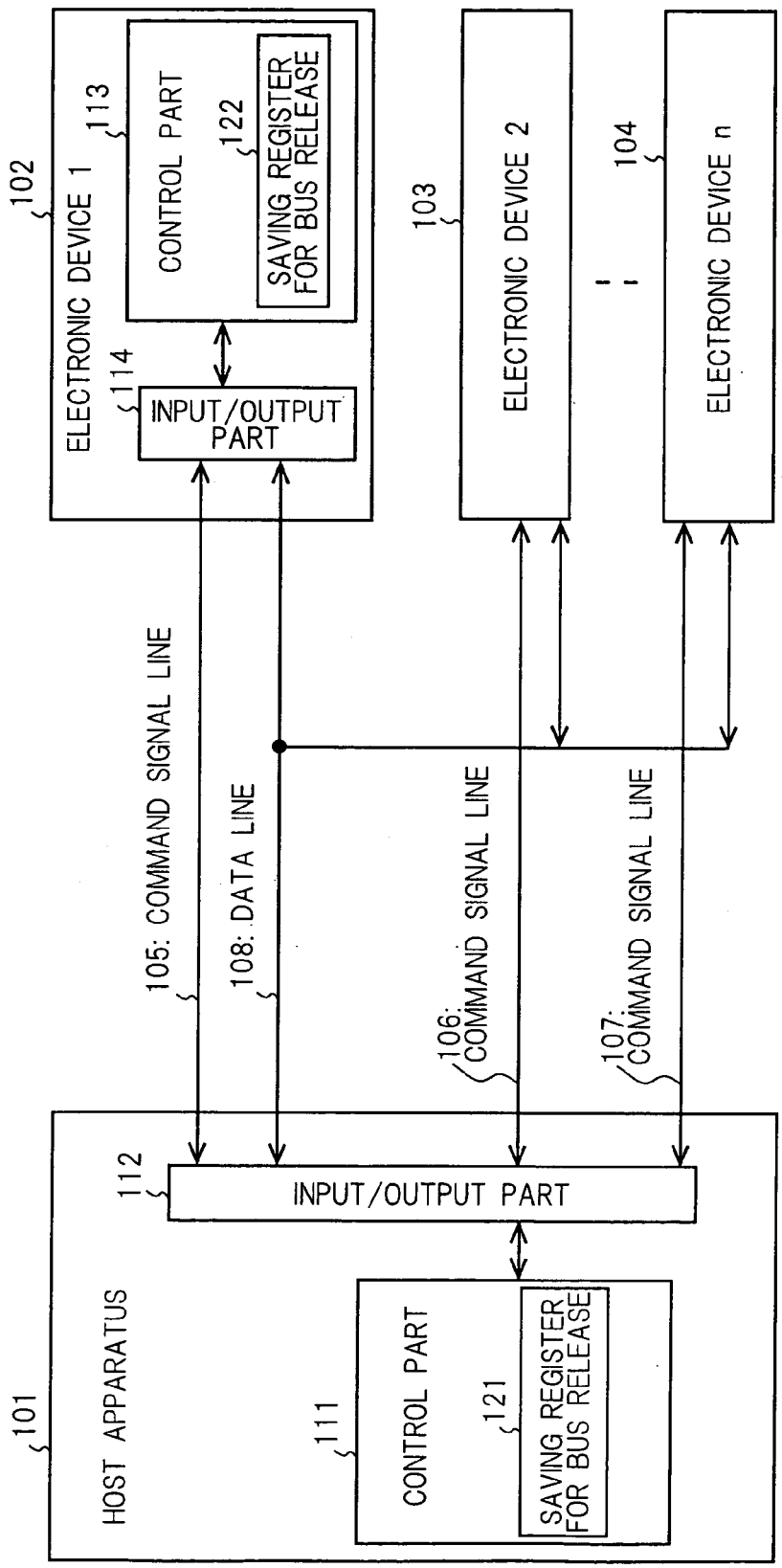
FIG. 1 is a block diagram showing the configuration of a transmission system in accordance with a first embodiment of the present invention.

FIG. 1 is a block diagram showing the configuration of a transmission system in accordance with a first embodiment of the present invention.

FIG. 1 shows a host apparatus 101, n number of electronic devices (where n is an integer of 2 or more) 102, 103, and 104, command signal lines 105, 106 and 107, and a data line 108. In FIG. 1, the electronic device 1 (102), the electronic device 2 (103) and the electronic device n (104) stand for n number of electronic devices.

The host apparatus 101 has a control part 111 and an input/output part 112. The control part 111 has a saving register for bus release 121. The host apparatus 101 may be any electronic device and in the first embodiment, a portable electronic device (for example, portable information terminal). The host apparatus 101 has a unique identifier. The unique identifier is, for example, a unique combination of 8-digit alphanumeric characters.

The electronic device 1 has a control part 113 and an input/output part 114. The control part 113 has a saving register for bus release 122.

The electronic devices 2 to n (103 to 104) have the same or different function that the electronic device 1 has, and each of them has the control part 113 and the input/output part 114. In FIG. 1, description of block configuration within the electronic devices 2 to n (103 to 104) is omitted.

The electronic devices 1 to n (102 to 104) each have an arbitrary function such as memory, wireless communicating part, wire communicating part, camera or so on. The electronic devices 1 to n (102 to 104) each have a unique identifier.

The electronic devices 1 to n (102 to 104) may be stored in their respective housings separately or included in a housing altogether.

In the first embodiment, the electronic devices 1 to n (102 to 104) are included in an IC card having multiple functions. In the first embodiment, the IC card having multiple functions is a SD (Secure Digital) card. The electronic devices 1 to n (102 to 104) are functional blocks for carrying out each of multiple functions.

The host apparatus 101 and the electronic devices 1 to n (102 to 104) constitute an information transmission system. In the transmission system, the host apparatus 101 serves as a master and the electronic devices 1 to n (102 to 104) serve as slaves.

The input/output part 112 of the host apparatus 101 is connected to the input/output parts *114 of the electronic devices 1 to n (102 to 104) by the command signal lines 105 to 107 and a data line 108. The command signal lines 105 to 107 each connect the input/output part 112 of the host apparatus 101 to the input/output parts 114 of the electronic devices 1 to n (102 to 104) independently. Therefore, the host apparatus 101 can issue a command to all of the electronic devices 1 to n (102 to 104) at any given timing.

The command signal lines 105 to 107 transmit a command signal from the host apparatus 101 to the electronic devices 1 to n (102 to 104) and a response signal from the electronic devices 1 to n (102 to 104) to the host apparatus 101 in response to the command signal.

In the transmission system of the first embodiment, the electronic devices 1 to n (102 to 104) are connected to the host apparatus 101 through the common data line 108. The data line 108 transmits data from the host apparatus 101 to the electronic devices 1 to n (102 to 104) and data from the electronic devices 1 to n (102 to 104) to the host apparatus 101.

The command signal lines and the data line may be either a single line or plural lines (bus). In the first embodiment, each of the command signal lines 105 to 107 is a single line and the data line 108 consists of four bus lines.

Signal transmission through the command signal lines and the data line may be either synchronous transmission or asynchronous transmission. In the first embodiment, synchronous transmission is adopted. The input/output part 112 of host apparatus 101 sends a clock signal for transmitting the command signal, response signal and data to the input/output parts 114 of the electronic devices 1 to n (102 to 104) through a clock signal line (not shown).

Figure 2:
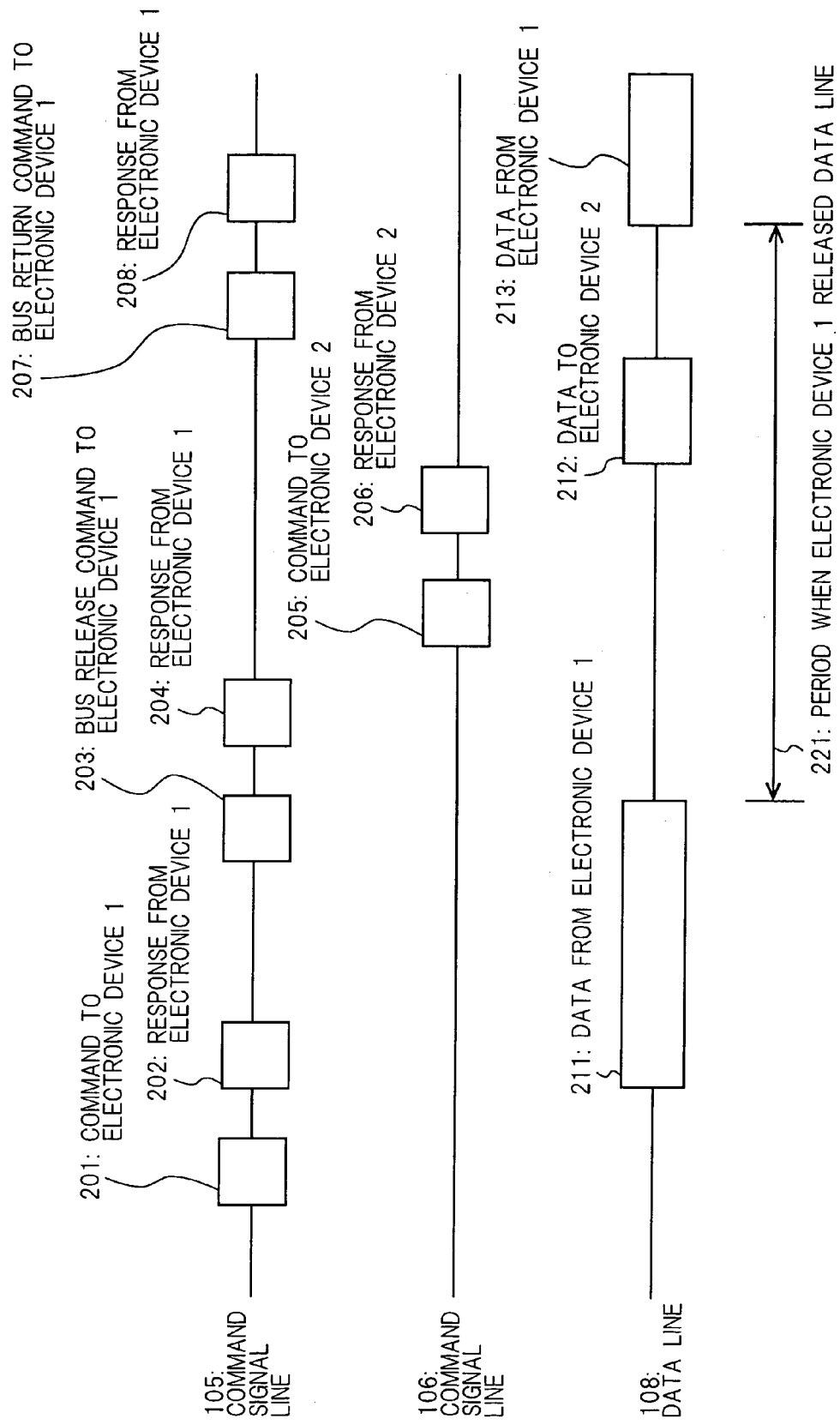
FIG. 2 is a time chart of the transmission system in accordance with the first embodiment of the present invention.

FIG. 2 is a schematic diagram for illustrating transmission of the command signal, response signal and data between the host apparatus 101 and the electronic devices 1 to n (102 to 104) in the transmission system in accordance with the first embodiment of the present invention. FIG. 2 shows the following case in detail: especially when one electronic device is occupying the data line, data transmission between the other electronic device and the host apparatus is executed.

The transmission system of the first embodiment uses the protocol that the host apparatus 101 transmits a command signal to one of the electronic devices and then the electronic device that received the command signal returns a response signal to the host apparatus and further, if necessary, data is transmitted from the host apparatus to the electronic device or from the electronic device to the host apparatus.

Referring to FIG. 1 and FIG. 2, operations of the transmission system in accordance with the first embodiment of the present invention will be described.

In FIG. 2, firstly, the control part 111 of the host apparatus 101 sends a command signal 201 (including an identifier of the host apparatus 101 as a source and an identifier of the electronic device 1 as a destination) for requesting data transmission to the electronic device 1 (102) through the command signal line 105. In response to the command signal 201, the control part 113 of the electronic device 1 (102) transmits a response signal 202 (including an identifier of the electronic device 1 as a source and an identifier of the host apparatus 101 as a destination) including information that transmission is possible (for example, an ACK signal) to the host apparatus 101 through the command signal line 105 and further transmits data 211 to the host apparatus 101 through the data line 108. As the data line 108 is occupied by the electronic device 1 (102), the other electronic devices 2 to n (103 to 104) cannot use the data line 108.

In the first embodiment, as each of the command signal lines 105 to 107 connects the host apparatus 101 to one of the electronic devices, source and destination of the command signal and the response signal are obvious. Therefore, the command signal and the response signal need not include identifiers of source and destination.

However, assuming that the control part 111 of the host apparatus 101 has to transmit data to the electronic device 2

(103) while transmitting data 211 from the electronic device 1 (102) to the host apparatus 101. In the transmission system of the first embodiment, the control part 111 of the host apparatus 101 transmits a command signal 203 (including an identifier of the host apparatus 101 as a source and an identifier of the electronic device 1 as a destination) for releasing the data line (data bus) 108 and suspending the processing that the electronic device 1 is executing (processing including data transmission) to the electronic device 1 (102) through the command signal line 105.

The control part 111 stores the information that the data line 108 has been released, the information on the current stage of the processing being currently executed (processing including data reception) and the identifier of the electronic device 1 (102) in a saving register for bus release 121.

In the first embodiment, the saving register for bus release 121 has a bus release flag. The bus release flag is generally set to 0, and changed to 1 when the control part 111 sends a command signal for releasing the data line (data bus) 108 during data transmission. After resumption of the suspended data transmission, the bus release flag is returned to 0 by the control part 111. In the first embodiment, the information that the data line 108 has been released means that the bus release flag of the saving register for bus release 121 is changed to 1.

The control part 113 of the electronic device 1 (102) receives the command signal 203 from the host apparatus 101, stores the information that data transmission has been suspended and the information on the current stage of the processing being currently executed (processing including data transmission) in a saving register for bus release 122, suspends the processing and releases the data line 108.

In the first embodiment, the saving register for bus release 122 has a bus release flag. The bus release flag is generally set to 0, and changed to 1 when the control part 111 of the electronic device 1 (102) receives a command signal for releasing the data line (data bus) 108 during data transmission. After the electronic device 1 (102) receives a command signal for resuming data transmission from the host apparatus 101 and resumes data transmission, the bus release flag is returned to 0 by the control part 113 of the electronic device 1 (102). In the first embodiment, the information that data transmission has been suspended means that the bus release flag of the saving register for bus release 122 is changed to 1.

"Information on the current stage of the processing being currently executed" may be any information by which data transmission can be suspended on the way and then resumed from the suspended point. For example, assuming that the electronic device 1 (102) receives a command to release the data line (data bus) (command signal from the host apparatus 101.) while transmitting data at the addresses 200 to 800 in a built-in RAM to the host apparatus 101 through the data line 108, and suspends data transmission at the point when data at the address 425 has been transmitted. The control part 111 of the host apparatus 101 and the control part 113 of the electronic device 1 (102) store the information that the electronic device 1 was executing the task of transmitting data at the addresses 200 to 800 in the built-in RAM and the last address 425 (or a first address 426 at the time of resumption) in a specific storage area, and further store an address of the specific storage area in the saving resisters for bus release 121, 122. Accordingly, when data transmission is resumed, the control part 111 of the host apparatus 101 and the control part 113 of the electronic device 1 (102) need only read out the address of the specific storage area from the saving resisters for bus release 121, 122, read out the task content and the last address 425 (or the first address 426 at the time of resumption) from the specific storage area and transmit data at the addresses 426 to 800.

In response to a bus release command (command signal 203), the control part 113 of the electronic device 1 (102) transmits a response signal 204 (including an identifier of the electronic device 1 (102) as a source and an identifier of the host apparatus 101 as a destination) for suspending the processing and notifying that the data line 108 has been released to the above-mentioned host apparatus 101 through the command signal line 105.

Based on the response signal 204, the control part 111 of the host apparatus 101 finds that the data line 108 has been released. Then, the control part 111 sends a command signal 205 (including an identifier of the host apparatus 101 as a source and an identifier of the electronic device 2 as a destination) for requesting to receive data transmitted from the host apparatus 101 to the electronic device 2 (103) through the command signal line 106. In response to the command signal 205, the control part 113 of the electronic device 2 (103) transmits a response signal 206 (including an identifier of the electronic device 2 as a source and an identifier of the host apparatus 101 as a destination) including information that reception is possible (for example, an ACK signal) to the host apparatus 101 through the command signal line 106. Next, data 212 is transmitted from the host apparatus 101 to the electronic device 2 (103) through the data line 108.

When data transmission between the host apparatus 101 and the electronic device 2 (103) is finished, the control part 111 of the host apparatus 101 reads out the information that the data line 108 has been released, the information on the current stage of the processing being currently executed (processing including data reception) and the identifier of the electronic device 1 (102) from the saving register for bus release 121. Based on the information, the control part 111 finds that the electronic device 1 (102) has suspended the processing so as to release the bus. The control part 111 of the host apparatus 101 transmits a command signal (bus return command) 207 (including an identifier of the host apparatus 101 as a source and an identifier of the electronic device 1 as a destination) for returning to the processing suspended by the electronic device 1 (processing that occupies the data line) to the electronic device 1 (102) through the above-mentioned command signal line.

The control part 113 of the electronic device 1 (102) receives the command signal (bus return command) 207 and transmits a response signal 208 (including an identifier of the electronic device 2 as a source and an identifier of the host apparatus 101 as a destination) including the information that return of processing is possible and the information as to whether the data line need to be reoccupied or not (In FIG. 2, the data line need to be reoccupied.) to the host apparatus 101 through the command signal line 105.

The control part 113 of the electronic device 1 (102) reads out the information that data transmission has been suspended on the way and the information on the current stage of the processing being currently executed (processing including data transmission) from a saving register for bus release 122. Similarly, the control part 111 of the host apparatus 101 reads out the information on the current stage of the processing being currently executed (processing including data reception) from a saving register for bus release 121.

Based on the information on the current stage of the processing being currently executed (processing including data transmission), the control part 111 and the control part 113 resume the suspended data transmission from the suspended point. In FIG. 2, the control part 113 transmits data 213 to the host apparatus 101 through the data line 108.

The control part 111 of the host apparatus 101 sets the bus release flag of the saving register for bus release 121 to be 0. Similarly, the control part 113 of the electronic device 1 (102) sets the bus release flag of the saving register for bus release 122 to be 0.

In the transmission system in accordance with the first embodiment of the present invention in which plural electronic devices are connected to one host apparatus through the common data line, even while one electronic device is occupying the data line, a release period 221 of the data line (FIG. 2) can be provided by transmitting the command to release the data line and the command to return data transmission from the host apparatus to the electronic device that occupies the data line. Whereby, data transmission between the host apparatus and the other electronic device can be performed during the release period 221 of the data line. After completion of data transmission between the host apparatus and the other electronic device, it becomes possible to resume data transmission between the host apparatus and the electronic device that had occupied the data line.

In the transmission system in accordance with the first embodiment of the present invention, a command signal line for transmitting a command signal from the host apparatus and a response signal to the command signal from the electronic devices is provided with each electronic device independently.

Second Embodiment

Figure 3:
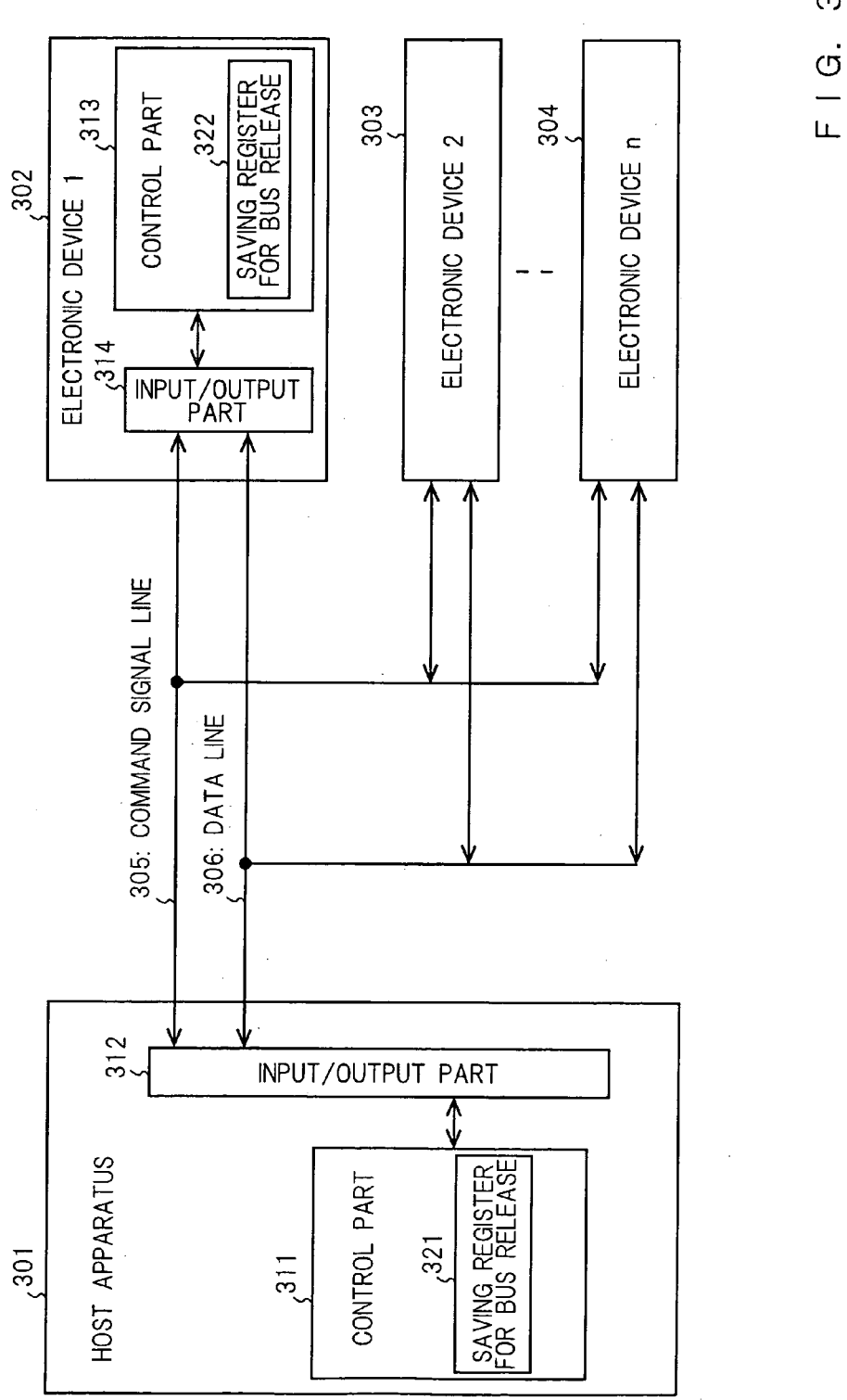
FIG. 3 is a block diagram showing the configuration of a transmission system in accordance with a second embodiment of the present invention.

FIG. 3 is a block diagram showing the configuration of a transmission system in accordance with a second embodiment of the present invention.

FIG. 3 shows a host apparatus 301, n number of electronic devices (where n is an integer of 2 or more) 302, 303, and 304, a command signal line 305 and a data line 306. In FIG. 3, the electronic device 1 (302), the electronic device 2 (303) and the electronic device n (304) stand for n number of electronic devices.

The host apparatus 301 has a control part 311 and an input/output part 312. The control part 311 has a saving register for bus release 321. The host apparatus 301 may be any electronic device and in the first embodiment, a portable electronic device (for example, a cellular phone). The host apparatus 301 has a unique identifier. The unique identifier is, for example, a unique combination of 8-digit alphanumeric characters.

The electronic device 1 has a control part 313 and an input/output part 314. The control part 313 has a saving register for bus release 322.

The electronic devices 2 to n (303 to 304) have the same or different function that the electronic device 1 (302) has, and each of them has the control part 313 and the input/output part 314. In FIG. 3, description of block configuration within the electronic devices 2 to n (303 to 304) is omitted.

The electronic devices 1 to n (302 to 304) have an arbitrary function such as memory, wireless communicating part, wire communicating part, camera or so on. The electronic devices 1 to n (302 to 304) each have a unique identifier.

The electronic devices 1 to n (302 to 304) may be stored in their respective housings separately or included in a housing altogether.

In the second embodiment, the electronic devices 1 to n (302 to 304) are included in an IC card having multiple functions. In the second embodiment, the IC card having multiple functions is a SD card. The electronic devices 1 to n (302 to 304) are functional blocks for carrying out each of multiple functions.

The host apparatus 301 and the electronic devices 1 to n (302 to 304) constitute an information transmission system. In the transmission system, the host apparatus 301 serves as a master and the electronic devices 1 to n (302 to 304) serve as slaves.

The input/output 312 of the host apparatus 301 is connected to the input/output parts 314 of the electronic devices 1 to n (302 to 304) by the command signal line 305 and the data line 306. The command signal line 305 is a common line that connects the input/output 312 of the host apparatus 301 to the input/output parts 314 of the electronic devices 1 to n (302 to 304). Accordingly, the host apparatus 301 can issue a command to all of the electronic devices at a time. Moreover, it can issue a command to a specific electronic device by using the identifier for identifying the electronic device.

The command signal line 305 transmits a, command signal from the host apparatus 301 to the electronic devices 1 to n (302 to 304) and a response signal from the electronic devices 1 to n (302 to 304) to the host apparatus 301 in response to the command signal.

In the transmission system of the second embodiment, the electronic devices 1 to n (302 to 304) are connected to the host apparatus 101 through the common data line 306. The data line 306 transmits data from the host apparatus 301 to the electronic devices 1 to n (302 to 304) and data from the electronic devices 1 to n (302 to 304) to the host apparatus 301.

The command signal line and the data line may be either a single line or plural lines (bus). In the second embodiment, the command signal line 305 is a single line and the data line 306 consists of four bus lines.

Signal transmission through the command signal line and the data line may be either synchronous transmission or asynchronous transmission. In the second embodiment, synchronous transmission is adopted. The input/output part 312 of host apparatus 301 sends a clock signal for transmitting the command signal, response signal and data to the input/output parts 314 of the electronic devices 1 to n (302 to 304) through a clock signal line (not shown).

Figure 4:
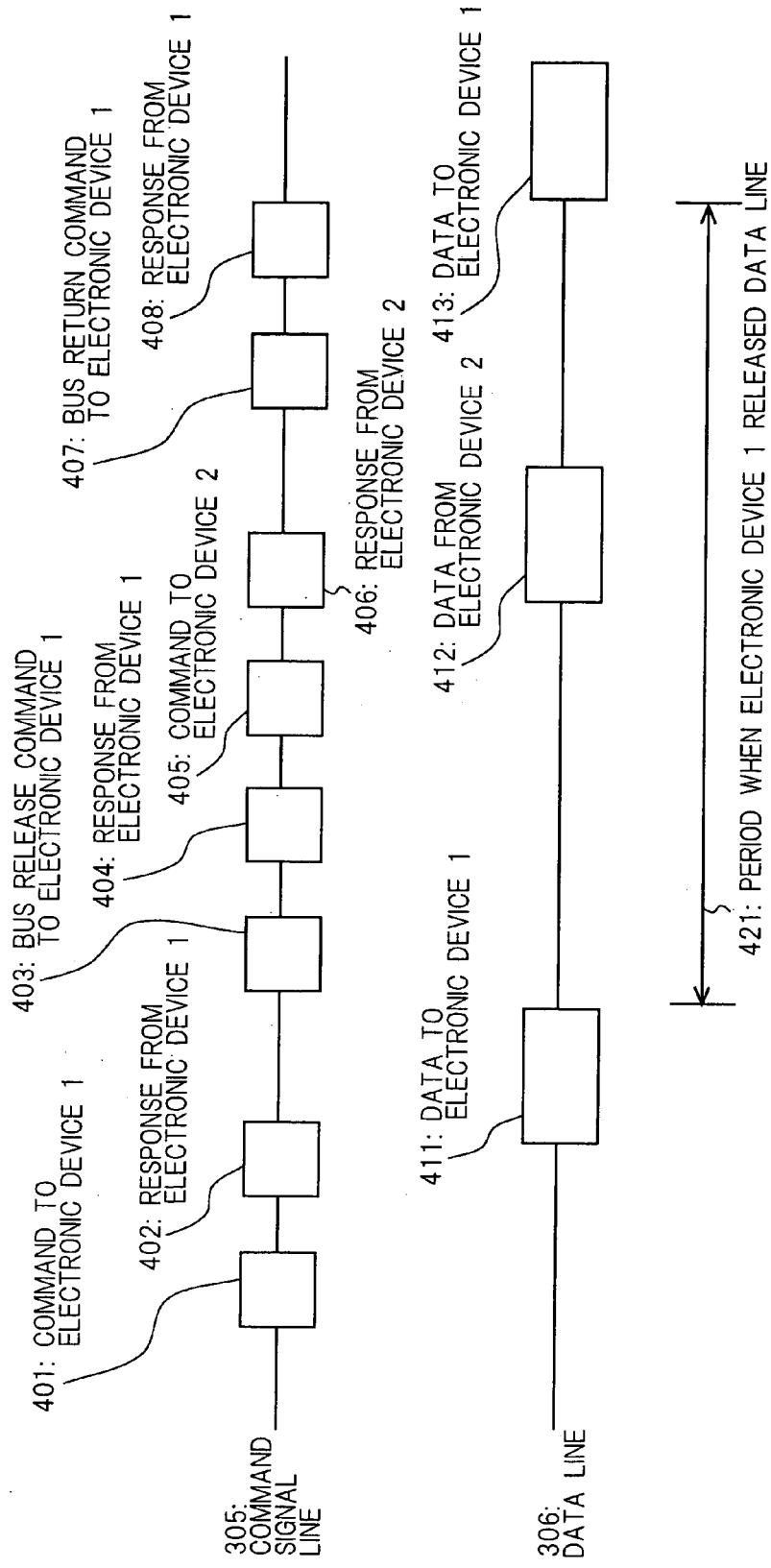
FIG. 4 is a time chart of the transmission system in accordance with the second embodiment of the present invention.

FIG. 4 is a diagram for illustrating the command signal, response signal and data between the host apparatus 301 and the electronic devices 1 to n (302 to 304) in the transmission system in accordance with the second embodiment of the present invention. FIG. 4 shows the following case in detail: especially when one electronic device is occupying the data line, data transmission between the other electronic device and the host apparatus is performed.

The transmission system of the second embodiment uses the protocol that the host apparatus 301 transmits a command signal to one of the electronic devices and then the electronic device that received the command signal returns a response signal to the host apparatus and further, if necessary, data is transmitted from the host apparatus to the electronic device or from the electronic device to the host apparatus.

Referring to FIG. 3 and FIG. 4, operations of the transmission system in accordance with the second embodiment of the present invention will be described.

In FIG. 4, firstly, the control part 311 of the host apparatus 301 sends a command signal 401 (including an identifier of the host apparatus 301 as a source and an identifier of the electronic device 1 as a destination) for requesting the electronic device 1 (302) to receive data transmitted from the host apparatus through the command signal line 305. In response to the command signal 401, the control part 313 of the electronic device 1 (302) transmits a response signal 402 (including an identifier of the electronic device 1as a source and an identifier of the host apparatus 301 as a destination) including information that reception is possible (for example, an ACK signal) to the host apparatus 301 through the command signal line 305. The host apparatus 301 transmits data 411 to the electronic device 1 (302) through the data line 306. As the data line 306 is occupied by the electronic device 1 (302), the other electronic devices 2 to n (303 to 304) cannot use the data line 306.

However, assuming that the control part 311 of the host apparatus 301 has to receive data from the electronic device 2 (303) while transmitting data 411 from the host apparatus 301 to the electronic device 1 (302). In the transmission system of the second embodiment, the control part 311 of the host apparatus 301 transmits a command signal 403 (including an identifier of the host apparatus 301 as a source and not including an identifier of a destination) for releasing the data line (data bus) 306 and suspending the processing that the electronic device 1 is executing (processing including data reception) to all of the electronic devices 1 to n (302 to 304) through the command signal line 305.

The control part 311 stores the information that the data line 306 has been released, and the information on the current stage of the processing being currently executed (processing including data transmission) in a saving register for bus release 321.

The control part 313 of the electronic device 1 (302) that occupies the data line currently receives the command signal 403 from the host apparatus 301, stores the information that data reception has been suspended and the information on the current stage of the processing being currently executed (processing including data reception) in a saving register for bus release 322, suspends the processing and releases the data line 306. As the other electronic devices 2 to n (303 to 304) do not use the data line currently, they ignore the command signal 403.

In response to a bus release command (command signal 403), the control part 313 of the electronic device 1 (302) transmits a response signal 404 (including an identifier of the electronic device 1 (302) as a source and an identifier of the host apparatus 301 as a destination) for suspending the processing and notifying that the data line 306 has been released to the above-mentioned host apparatus 301 through the command signal line 305.

Based on the response signal 404, the control part 311 of the host apparatus 301 finds that the data line 306 has been released. Then, the control part 311 sends a command signal 405 (including an identifier of the host apparatus 301 as a source and an identifier of the electronic device 2 as a destination) for requesting data transmission to the electronic device 2 (303) through the command signal line 305. In response to the command signal 405, the control part 313 of the electronic device 2 (303) transmits a response signal 406 (including an identifier of the electronic device 2 as a source and an identifier of the host apparatus 301 as a destination) including information that data transmission is possible (for example, an ACK signal) to the host apparatus 301 through the command signal line 305. Next, data 412 is transmitted from the host apparatus 301 to the electronic device 2 (303) through the data line 306.

When data transmission between the host apparatus 301 and the electronic device 2 (303) is finished, the control part 311 of the host apparatus 301 reads out the information that the data line 306 has been released and the information on the current stage of the processing being currently executed (processing including data transmission) from the saving register for bus release 321. Based on the information, the control part 311 finds that the processing has been suspended so as to release the bus. The control part 311 of the host apparatus 301 transmits a command signal (bus return command) 407 (including an identifier of the host apparatus 301 as a source and an identifier of the electronic device 1, and not including an identifier of a destination) for returning to the suspended processing (processing that occupies the data line) to all of the electronic devices 1 to n (302 to 304) through the above-mentioned command signal line.

Based on the information reads out from the saving register for bus release 322 that data reception has been suspended on the way, the control part 313 of the electronic device 1 (302) finds that the a command signal 407 from the host apparatus 301 is a command signal the electronic addressed to the electronic device 1 (302).

As there is no information that data reception has been suspended on the way in the saving register for bus release 322, the other electronic devices 2 to n (303 to 304) ignore the command signal 407.

The control part 313 of the electronic device 1 (302) receives the command signal (bus return command) 407 and transmits a response signal 408 (including an identifier of the electronic device 2 as a source and an identifier of the host apparatus 301 as a destination) including the information that return of processing is possible and the information as to whether the data line need to be reoccupied or not (In FIG. 4, the data line need to be reoccupied.) to the host apparatus 301 through the command signal line 305.

The control part 311 of the host apparatus 301 reads out the information on the current stage of the processing being currently executed (processing including data transmission) from a saving register for bus release, 321. Similarly, the control part 313 of the electronic device 1 (302) reads out the information on the current stage of the processing being currently executed (processing including data transmission) from a saving register for bus release 322.

Based on the information on the current stage of the processing being currently executed (processing including data transmission), the control part 311 of the host apparatus 301 resumes the suspended data transmission from the suspended point. In FIG. 4, the control part 311 transmits data 413 to the electronic device 1 (302) through the data line 306.

In the transmission system of the second embodiment, the bus release command and the bus return command include no identifier of the destination. In other embodiments, the bus release command and the bus return command include identifiers of the source and the destination.

In the transmission system in accordance with the second embodiment of the present invention in which plural electronic devices are connected to one host apparatus through the common data line, even while one electronic device is occupying the data line, a release period 421 of the data line (FIG. 4) can be provided by transmitting the command to release the data line and the command to return data transmission from the host apparatus to the electronic device that occupies the data line. Whereby, data transmission between the host apparatus and the other electronic device can be executed during the release period 421 of the data line. After completion of data transmission between the host apparatus and the other electronic device, it becomes possible to resume data transmission between the host apparatus and the electronic device that had occupied the data line.

Third Embodiment

Figure 5:
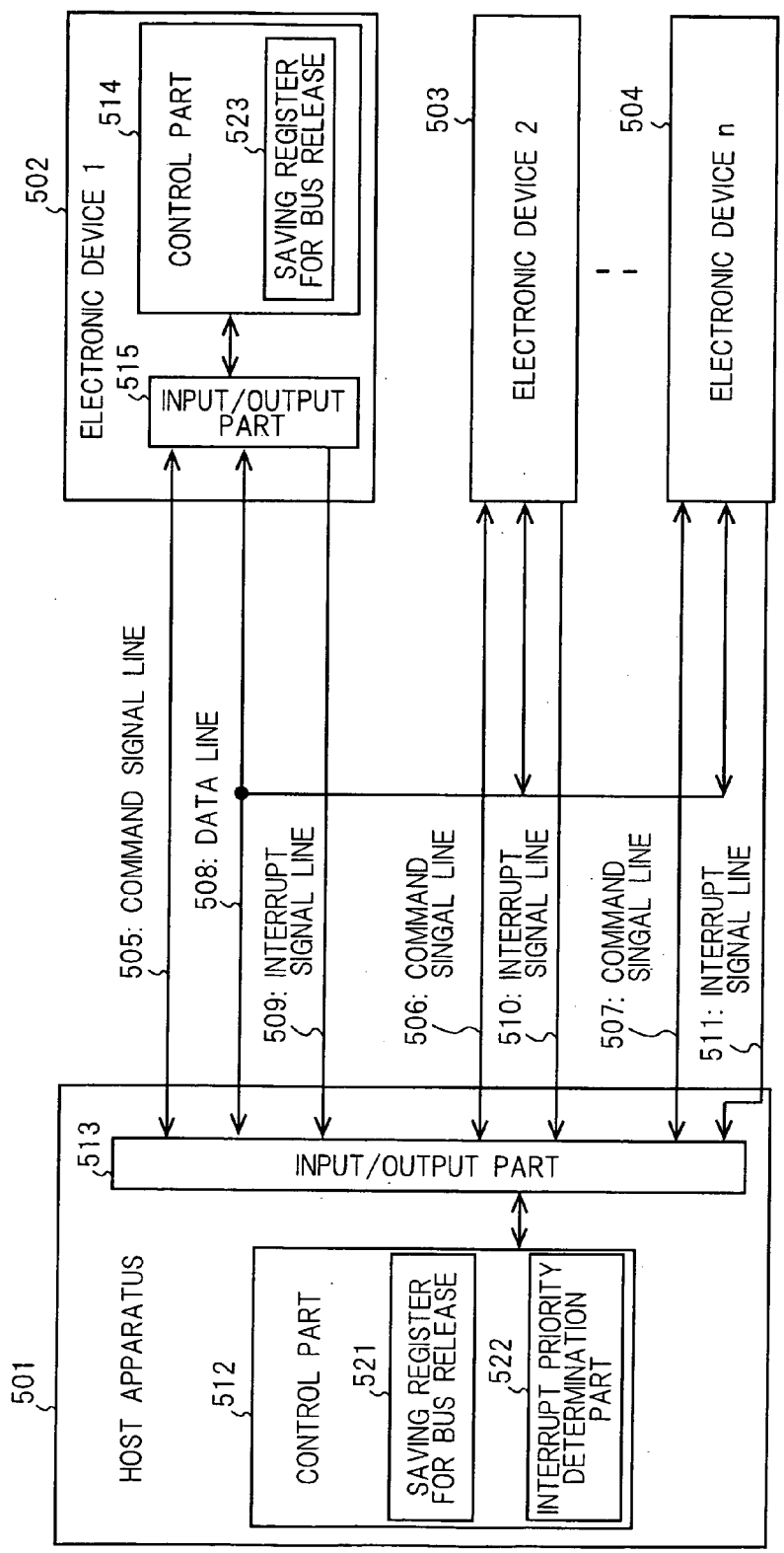
FIG. 5 is a block diagram showing the configuration of a transmission system in accordance with a third embodiment of the present invention.

FIG. 5 is a block diagram of a transmission system in accordance with a third embodiment of the present invention.

FIG. 5 shows a host apparatus 501, n number of electronic devices (where n is an integer of 2 or more) 502, 503, and 504, command signal lines 505, 506 and 507, and a data line 108. In FIG. 5, the electronic device 1 (502), the electronic device 2 (503) and the electronic device n (504) stand for n number of electronic devices.

The host apparatus 501 has a control part 512 and an input/output part 513. The control part 512 has a saving register for bus release 521 and an interrupt priority determination part 522. The host apparatus 501 may be any electronic device and in the third embodiment, a portable electronic device (for example, portable an information terminal). The host apparatus 501 has a unique identifier. The unique identifier is, for example, a unique combination of 8-digit alphanumeric characters.

The electronic device 1 has a control part 514 and an input/output part 515. The control part 514 has a saving register for bus release 523.

The electronic devices 2 to n (503 to 504) have the same or different function that the electronic device 1 has, and each of them has the control part 514 and the input/output part 515. In FIG. 5, description of block configuration within the electronic devices 2 to n (503 to 504) is omitted.

The electronic devices 1 to n (502 to 504) have an arbitrary function. The electronic devices 1 to n (502 to 504) each have a unique identifier.

The electronic devices 1 to n (502 to 504) may be stored in their respective housings separately or included in a housing altogether.

In the third embodiment, the electronic devices 1 to n (502 to 504) are included in an IC card having multiple functions. In the third embodiment, the IC card having multiple functions is a SD card. The electronic devices 1 to n (502 to 504) are functional blocks for carrying out each of multiple functions.

The host apparatus 501 and the electronic devices 1 to n (502 to 504) constitute an information transmission system. In the transmission system, the host apparatus 501 serves as a master and the electronic devices 1 to n (502 to 504) serve as slaves.

The input/output part 513 of the host apparatus 501 is connected to the input/output parts 515 of the electronic devices 1 to n (502 to 504) by the command signal lines 505 to 507, a data line 508 and interrupt signal lines 509 to 511. The command signal lines 505 to 507 each connect the input/output part 513 of the host apparatus 501 to the input/output parts 515 of the electronic devices 1 to n (502 to 504) independently. Therefore, the host apparatus 501 can issue a command to all of the electronic devices 1 to n (502 to 504) at any given timing.

The command signal lines 505 to 507 transmit a command signal from the host apparatus 501 to the electronic devices 1 to n (502 to 504) and a response signal from the electronic devices 1 to n (502 to 504) to the host apparatus 501 in response to the command signal.

In the transmission system of the third embodiment, the electronic devices 1 to n (502 to 504) are connected to the host apparatus 501 through the common data line 508. The data line 508 transmits data from the host apparatus 501 to the electronic devices 1 to n (502 to 504) and data from the electronic devices 1 to n (502 to 504) to the host apparatus 501.

The command signal lines and the data line may be either a single line or plural lines (bus). In the third embodiment, each of the command signal lines 505 to 507 is a single line and the data line 508 consists of two bus lines.

Signal transmission through the command signal lines and the data line may be either synchronous transmission or asynchronous transmission. In the third embodiment, synchronous transmission is adopted. The input/output part 513 of host apparatus 501 sends a clock signal for transmitting the command signal, response signal and data to the input/output part 515 of the electronic devices 1 to n (502 to 504) through a clock signal line (not shown).

The interrupt signal lines 509 to 511 each connects the input/output parts 515 of the electronic devices 1 to n (502 to 504) to the input/output part 513 of the host apparatus 501 independently. Therefore, each of the electronic devices 1 to n (502 to 504) can issue an interrupt signal to the host apparatus 501 at any give timing.

The interrupt signal lines 509 to 511 transmits an interrupt signal from each of the electronic devices 1 to n (502 to 504) to the host apparatus 501.

Figure 6:
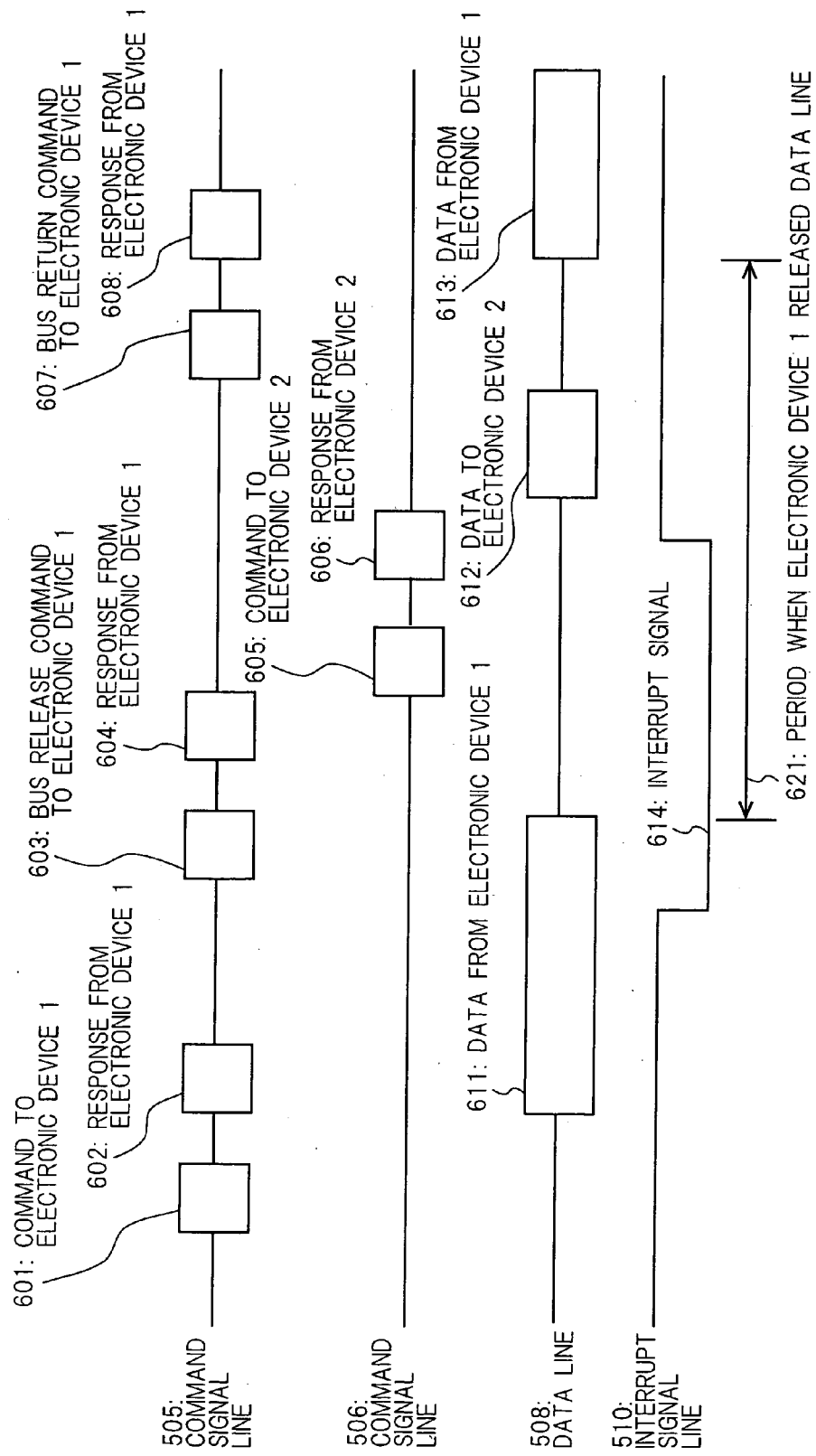
FIG. 6 is a time chart of the transmission system in accordance with the third embodiment of the present invention.

FIG. 6 is a diagram for illustrating the command signal, response signal and data between the host apparatus 501 and the electronic devices 1 to n (502 to 504) in the transmission system in accordance with the third embodiment of the present invention. FIG. 6 shows the following case in detail: especially when one electronic device is occupying the data line, data transmission between the other electronic device and the host apparatus is executed.

The transmission system of the third embodiment uses the protocol that the host apparatus 501 transmits a command signal to one of the electronic devices and then the electronic device that received the command signal returns a response signal to the host apparatus and further, if necessary, data is transmitted from the host apparatus to the electronic device or from the electronic device to the host apparatus.

The transmission system of the third embodiment is similar to the transmission system of the first embodiment. In the transmission system of the first embodiment, in the case where the host apparatus 101 intends to transmit or receive data to or from the electronic device other than the electronic device that occupies the data line currently, the electronic device that occupies the data line currently is made to release the data line and data transmission between the host apparatus and the electronic device other than the electronic device that occupies the data line currently is executed.

In addition to the above-mentioned case, in the transmission system of the third embodiment, in the case where the electronic device (slave) intends to transmit or receive data to or from the host apparatus while the other electronic device is occupying the data line, the electronic device that occupies the data line currently is made to release the data line by sending an interrupt signal to the host apparatus, so that data transmission between the electronic device and the host apparatus can be executed.

Referring to FIG. 5 and FIG. 6, operations of the transmission system in accordance with the third embodiment of the present invention will be described. Description of the same operations as those in the first embodiment is omitted.

In FIG. 6, firstly, the control part 512 of the host apparatus 501 sends a command signal 601 for requesting data transmission to the electronic device 1 (502) through the command signal line 505. In response to the command signal 601, the electronic device 1 (502) transmits a response signal 602 including information that transmission is possible (for example, an ACK signal) to the host apparatus 501 through the command signal line 505, and further transmits data 611 to the host apparatus 501 through the data line 508. As the data line 508 is occupied by the electronic device 1 (502), the other electronic devices 2 to n (503 to 504) cannot use the data line 508.

However, assuming that the electronic device 2 (503) has to receive data from the host apparatus 501 while transmitting data 611 from the electronic device 1 (502) to the host apparatus 501. The control part 515 of the electronic device 2 (503) transmits an interrupt signal 614 to the host apparatus 501 through the interrupt signal line 510.

When receiving the interrupt signal 614, the interrupt priority determination part 522 of the control part 512 of the host apparatus 101 determines which of data transmission that being performed currently or data transmission requested from the electronic device 2 (503) should be given priority. In FIG. 6, the interrupt priority determination part 522 determines that data transmission requested from the electronic device 2 (503) should be given priority.

The host apparatus 501 transmits a command signal 603 for releasing the data line (data bus) 508 and suspending the processing that the electronic device 1 is executing (processing including data transmission) to the electronic device 1 (502) through the command signal line 505.

The electronic device 1 (502) receives the command signal 603, suspends the processing (including data transmission) and releases the data line 508.

In response to the bus release command (command signal 603), the electronic device 1 (502) transmits a response signal 604 for suspending the processing (including data transmission) and notifying that the data line 508 has been released to the above-mentioned host apparatus 501 through the command signal line 505.

Based on the response signal 604, the host apparatus 501 finds that the data line 508 has been released. Then, the host apparatus 501 sends a command signal 605 for notifying that data is transmitted from the host apparatus 501 to the electronic device 2 (503) in response to the interrupt signal 614 through the command signal line 506. In response to the command signal 605, the control part 514 of the electronic device 2 (503) transmits a response signal 606 including the information that data reception is possible (for example, an ACK signal) to the host apparatus 501 through the command signal line 506. Next, data 612 is transmitted from the host apparatus 501 to the electronic device 2 (503) through the data line 508.

When data transmission between the host apparatus 501 and the electronic device 2 (503) is finished, the host apparatus 501 transmits a command signal (bus return command) 607 for returning to the suspended processing (processing that occupies the data line) to the electronic device 1 (502) through the command signal line 505.

The electronic device 1 (502) receives the command signal (bus return command) 607 and transmits a response signal 608 including the information that return of processing is possible and the information as to whether the data line need to be reoccupied or not (In FIG. 6, the data line need to be reoccupied.) to the host apparatus 501 through the command signal line 505.

The electronic device 1 (502) resumes the suspended data transmission from the suspended point. In FIG. 6, the electronic device 1 (502) transmits data 613 to the host apparatus 501 through the data line 508.

In the transmission system in accordance with the third embodiment of the present invention in which plural electronic devices are connected to one host apparatus through the common data line, even while one electronic device is occupying the data line, a release period 621 of the data line (FIG. 6) can be provided by transmitting the command to release the data line and the command to return data transmission from the host apparatus to the electronic device that occupies the data line. Whereby, data transmission between the host apparatus and the other electronic device can be performed during the release period 621 of the data line. After completion of data transmission between the host apparatus and the other electronic device, it becomes possible to resume data transmission between the host apparatus and the electronic device that had occupied the data line.

A command signal line that sends a command from the host apparatus and a response of the electronic device in response to the command is provided separately for each electronic device and the command to suspend and resume data transmission are transmitted through the command signal line, thereby that the transmission system in which the other electronic device with higher priority is capable of executing data transmission even during processing that occupies the data line can be realized.

Fourth Embodiment

Figure 7:
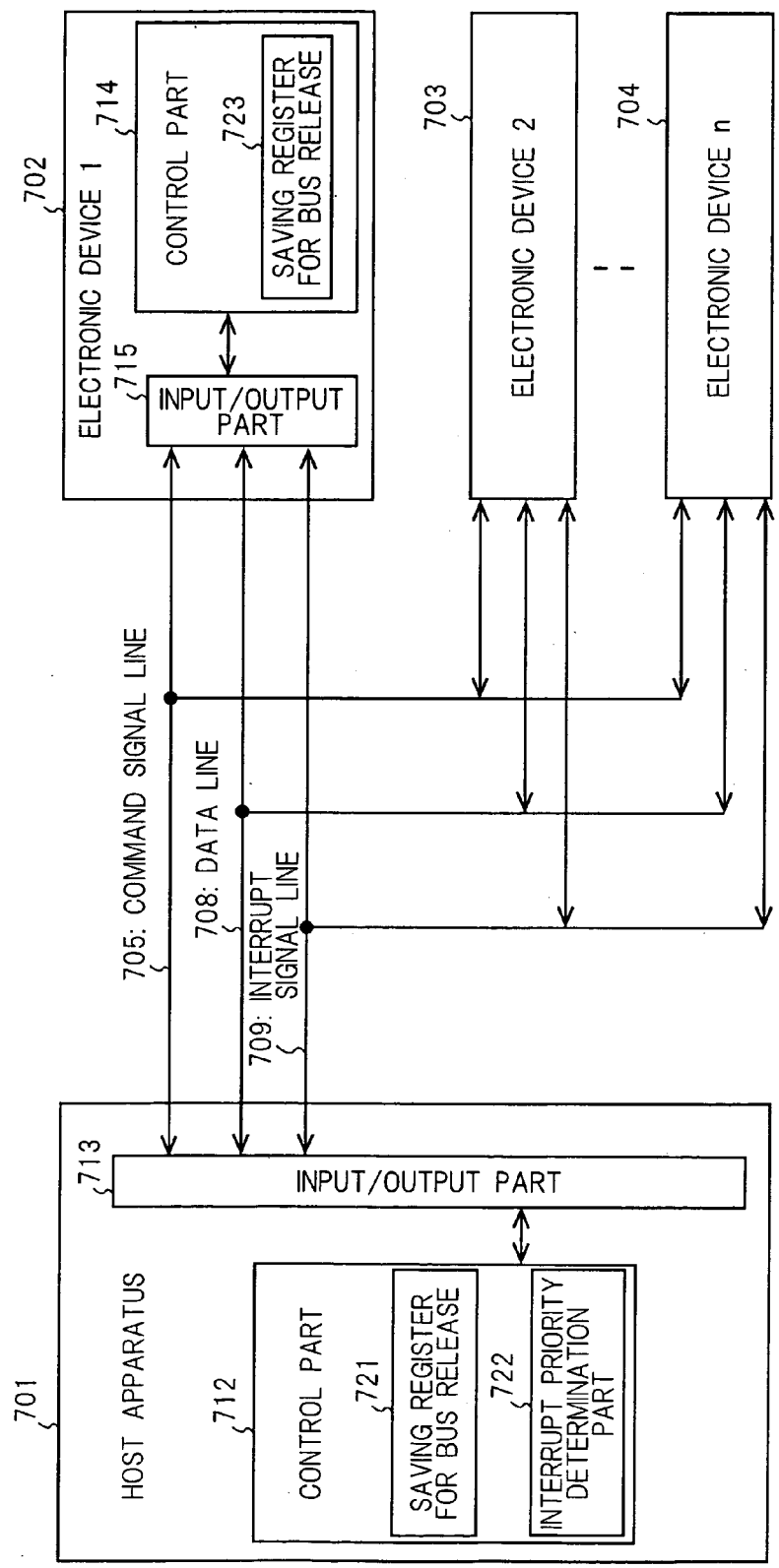
FIG. 7 is a block diagram showing the configuration of a transmission system in accordance with a fourth embodiment of the present invention.

FIG. 7 is a block diagram showing the configuration of a transmission system in accordance with a fourth embodiment of the present invention. The transmission system of the fourth embodiment is similar to the transmission system of the third embodiment (FIG. 5).

In the transmission system of the third embodiment, the host apparatus 501 is connected to n number of electronic devices 502 to 504 (n is an integers of 2 or more) by n number of command signal lines 505 to 507 independently, and interrupt signal lines 508 to 511 from n number of electronic devices 502 to 504 to the host apparatus 501 are n number of lines separated from each other.

In the transmission system of the fourth embodiment, the host apparatus 701 is connected to n number of (n is an integers of 2 or more) electronic devices 702 to 704 by a common command signal line 705, and the host apparatus 701 and n number of electronic devices 702 to 704 each have a unique identifier and transmits a command signal and a response signal with unique identifiers indicating source and destination through a command signal line 705.

In the transmission system of the fourth embodiment, the host apparatus 701 is connected to n number of (n is an integers of 2 or more) electronic devices 702 to 704 by a common interrupt signal line 709. When inputting an interrupt signal, the host apparatus 701 makes the electronic device that occupies the bus release the data line once (transmits a bus release command) and then transmits a command signal for inquiring content of the interrupt request to all of the electronic devices 702 to 704. The electronic device that sent the interrupt signal returns the response signal for notifying content of the interrupt request (an identifier of the electronic device is added) to the host apparatus 701 through the command signal line 705.

Based on the response signal, the host apparatus 701 judges which electronic device makes what interrupt request, and an interrupt priority determination part 722 determines whether the interrupt processing should be given priority or not. In the case where processing of the electronic device that occupies the data line currently is given priority, bus return command is sent to the electronic device to resume data transmission. In the case where processing of the electronic device that sends the interrupt request is given priority, the processing is executed, and after completion of the processing, bus return command is sent to the electronic device that had occupied the data line to resume data transmission.

The transmission system of the fourth embodiment can achieve the same effect as the transmission system of the third embodiment.

Fifth Embodiment

Figure 8:
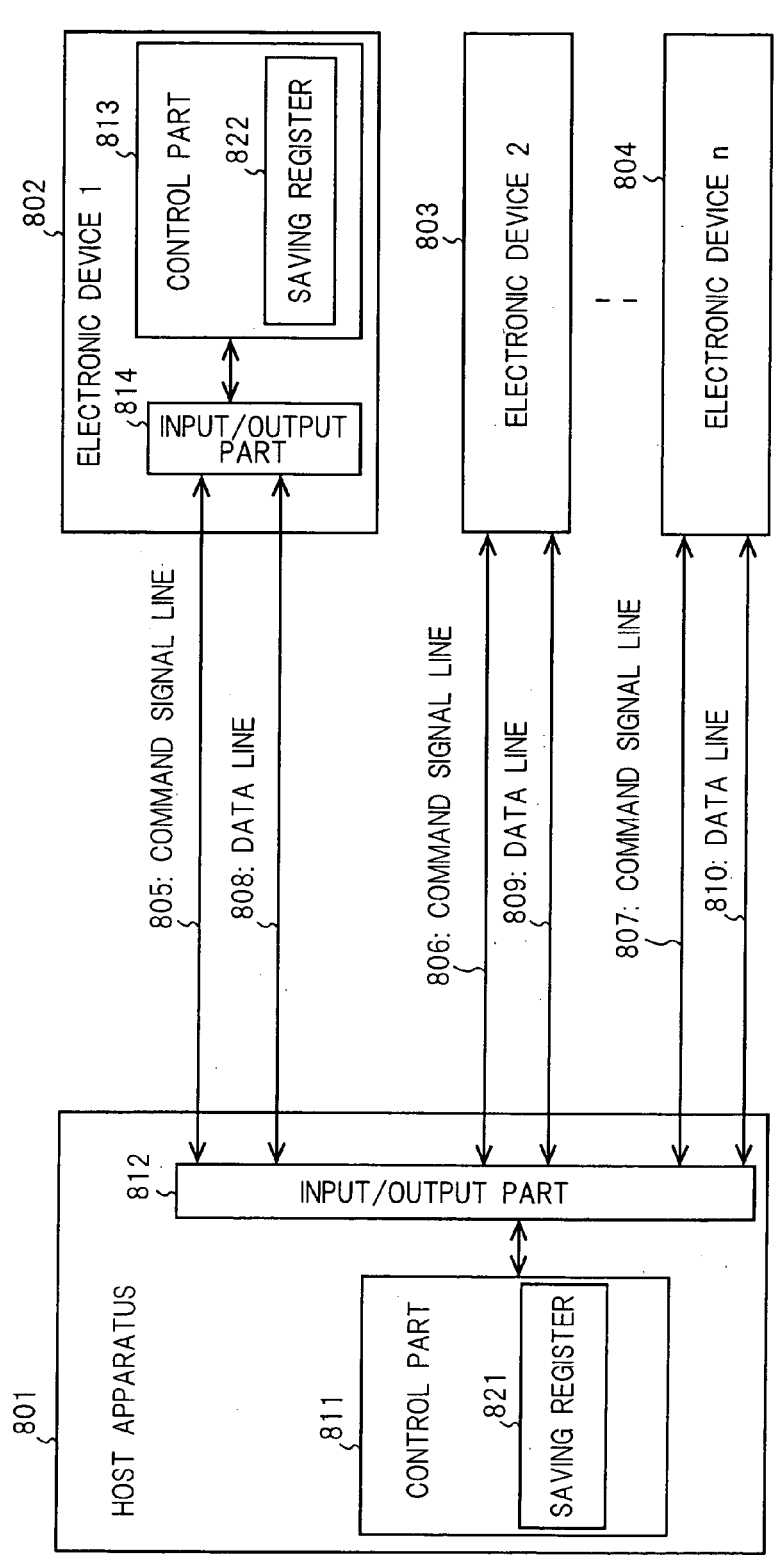
FIG. 8 is a block diagram showing the configuration of a transmission system in accordance with a fifth embodiment of the present invention.

FIG. 8 is a block diagram of a transmission system in accordance with a fifth embodiment of the present invention.

FIG. 8 shows a host apparatus 801, n number of electronic devices (where n is an integer of 2 or more) 802 to 804, command signal lines 805 to 807 and data lines 808 to 810. In FIG. 8, the electronic device 1 (802), the electronic device 2 (803) and the electronic device n (804) stand for n number of electronic devices.

The host apparatus 801 has a control part 811 and an input/output part 812. The control part 811 has a saving register for bus release 821. The host apparatus 801 may be any electronic device and in the fifth embodiment, a portable electronic device (for example, portable a cellular phone). The host apparatus 801 has a unique identifier. The unique identifier is, for example, a unique combination of 8-digit alphanumeric characters.

The electronic device 1 has a control part 813 and an input/output part 814. The control part 813 has a saving register 822.

The electronic devices 2 to n (803 to 804) have the same or different function that the electronic device 1 (802) has, and each of them has the control part 813 and the input/output part 814. In FIG. 8, description of block configuration within the electronic devices 2 to n (803 to 804) is omitted.

The electronic devices 1 to n (802 to 804) have an arbitrary function such as memory, wireless communicating part, wire communicating part, camera or so on. The electronic devices 1 to n (802 to 804) each have a unique identifier.

The electronic devices 1 to n (802 to 804) may be stored in their respective housings separately or included in a housing altogether.

In the fifth embodiment, the electronic devices 1 to n (802 to 804) are included in an IC card having multiple functions. In the fifth embodiment, the IC card having multiple functions is a SD card. The electronic devices 1 to n (802 to 804) are functional blocks for carrying out each of multiple functions.

The host apparatus 801 and the electronic devices 1 to n (802 to 804) constitute an information transmission system. In the transmission system, the host apparatus 801 serves as a master and the electronic devices 1 to n (802 to 804) serve as slaves.

The input/output part 812 of the host apparatus 801 is connected to the input/output parts 814 of the electronic devices 1 to n (802 to 804) by the command signal line 805 to 807 and the data lines 808 to 810.

The command signal lines 805 to 807 transmit a command signal from the host apparatus 801 to the electronic devices 1 to n (802 to 804) and a response signal from the electronic devices 1 to n (802 to 804) to the host apparatus 801 in response to the command signal.

The data lines 808 to 810 transmit data from the host apparatus 801 to the electronic devices 1 to n (802 to 804) and data from the electronic devices 1 to n (802 to 804) to the host apparatus 801.

In the transmission system of the fifth embodiment, as a dedicated command signal line and data line are provided with each electronic device, communication of two electronic devices does not compete with each other on the command signal line or the data line. However, it is assumed that the following case occurs.

Figure 9:
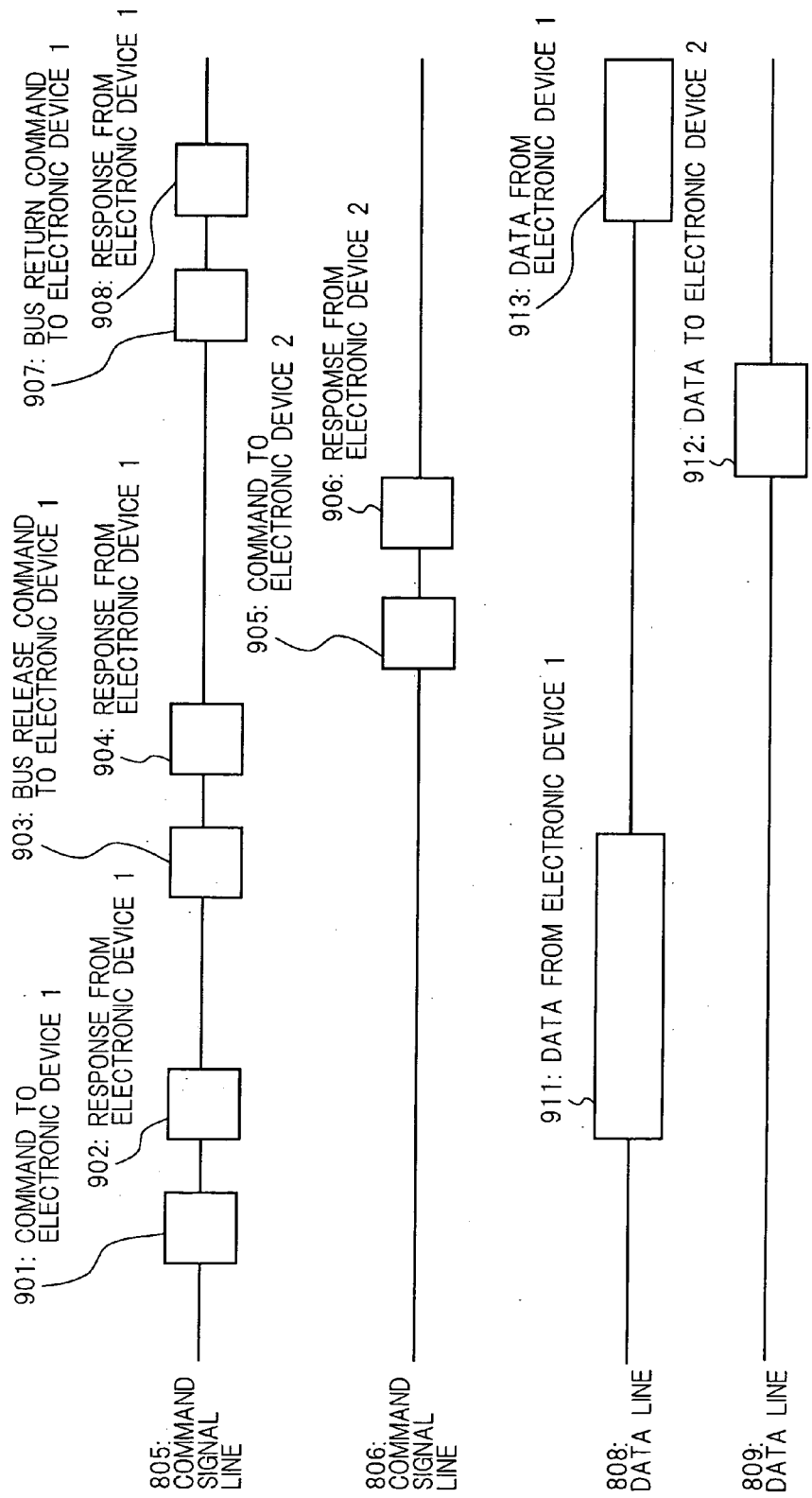
FIG. 9 is a time chart of the transmission system in accordance with the fifth embodiment of the present invention.

While communicating with one electronic device (for example, the electronic device 1), the host apparatus has to communicate with the other electronic device (for example, the electronic device 2). The newly required communication has a higher priority than the communication that being executed currently. As simultaneous communication with two electronic devices exceeds an upper limit of throughput capacity of the host apparatus (having a microcomputer), the host apparatus cannot communicate with two electronic devices simultaneously. In such case, the host apparatus 801 of the fifth embodiment suspends the current communication and executes the newly required communication with higher priority. After completion of the communication, previous communication is resumed from the suspended point. FIG. 9 is a diagram for illustrating the command signal, response signal and data between the host apparatus 801 and the electronic devices 1 to n (802 to 804) in the above-mentioned case.

The transmission system of the fifth embodiment uses the protocol that the host apparatus 801 transmits a command signal to one of the electronic devices and then the electronic device that received the command signal returns a response signal to the host apparatus and further, if necessary, data is transmitted from the host apparatus to the electronic device or from the electronic device to the host apparatus.

Referring to FIG. 8 and FIG. 9, operations of the transmission system in accordance with the second embodiment of the present invention will be described.

In FIG. 9, firstly, the control part 811 of the host apparatus 801 sends a command signal 901 to the electronic device 1 (802). In response to the command signal 901, the control part 813 of the electronic device 1 (802) transmits a response signal 902 to the host apparatus 801. The host apparatus 801 transmits data 911 to the electronic device 1 (802) through the data line 808.

However, assuming that the control part 811 of the host apparatus 801 has to receive data from the electronic device 2 (803) while transmitting data 911 from the host apparatus 801 to the electronic device 1 (802). Priority of the communication is high. The control part 811 of the host apparatus 801 transmits a command signal 903 for suspending the processing that the electronic device 1 is executing (processing including data reception) to the electronic device 1 (802).

The control part 811 stores the information on the current stage of the processing being currently executed (processing including data transmission) in a saving register for bus release 821.

The control part 813 of the electronic device 1 (802) that is performing communication currently receives the command signal 903 from the host apparatus 801, stores the information that data reception has been suspended and the information on the current stage of the processing being currently executed (processing including data reception) in a saving register for bus release 822 and suspends the processing.

In response to the command signal 903, the control part 813 of the electronic device 1 (802) transmits a response signal 904 for suspending the processing and notifying it to the host apparatus 801.

The control part 811 of the host apparatus 801 sends a command signal 905 for requesting the host apparatus 801 to transmit data to the electronic device 2 (803). In response to the command signal 905, the control part 813 of the electronic device 2 (803) transmits a response signal 906 (for example, an ACK signal) to the host apparatus 801. Next, data 912 is transmitted from the electronic device 2 (803) to the host apparatus 801 through the data line 806.

When data transmission between the host apparatus 801 and the electronic device 2 (803) is finished, the control part 811 of the host apparatus 801 reads out the information that data reception from the electronic device 1 has been suspended and the information on the current stage of the processing being currently executed (processing including data transmission) from the saving register 821. Based on the information, the control part 811 finds that the processing has been suspended. The control part 811 of the host apparatus 801 transmits a command signal (bus return command) 907 for returning to the suspended processing to the electronic device 1 (802).

The control part 813 of the electronic device 1 (802) receives the command signal (bus return command) 907 and transmits a response signal 908 including the information that return of processing is possible to the host apparatus 801 through the command signal line 805.

The control part 811 of the host apparatus 801 reads out the information on the current stage of the processing being currently executed (processing including data transmission) from a saving register for bus release 821. Similarly, the control part 813 of the electronic device 1 (802) reads out the information on the current stage of the processing being currently executed (processing including data transmission) from a saving register 822.

Based on the information on the current stage of the processing being currently executed (processing including data transmission), the control part 811 of the host apparatus 801 resumes the suspended data transmission from the suspended point. In FIG. 9, the control part 811 transmits data 913 to the electronic device 1 (802) through the data line 806.

In the transmission system in accordance with the fifth embodiment of the present invention in which plural electronic devices are connected to one host apparatus through the common data line, even while the host apparatus is communicating with one electronic device (given that the host apparatus has no capability to communicate with two targets simultaneously), the host apparatus can communicate with the other electronic device by suspending the communication. After completion of data transmission between the host apparatus and the other electronic device, it becomes possible to resume data transmission between the host apparatus and the initial electronic device.

In the transmission system of the present invention, even while one electronic device is occupying the data line, data transmission between the other electronic device and the host apparatus can be executed if necessary. The host apparatus can resume communicate with the initial electronic device efficiently (by avoiding waste of transmitting same data redundantly regardless of being needless). This achieves an advantageous effect that a transmission system with quick response in which plural electronic devices are connected to one host apparatus through a common data line, a method for controlling the system, a host apparatus and electronic devices constituting the transmission system can be realized.

In the case where plural functional blocks are mounted in the electronic device, input and output terminals of which are regulated according to a standard, such as an IC card, it is difficult to extend the data bus of the host apparatus. Accordingly, data transmission between plural functional blocks and the host apparatus need to be executed through a common data bus. Further, depending on the function, it is required to start data transmission between plural functional blocks and the host apparatus rapidly. The present invention achieves an advantageous effect that a transmission system in which plural functional blocks are operated through a common data bus and these functional blocks have quick response, a method for controlling the system, a host apparatus and electronic devices constituting the transmission system can be realized.

In the transmission system of the present invention, even while the host apparatus is communicating with one electronic device, the host apparatus can suspends the communication if necessary and transmit or receive data to or from the other electronic device. The host apparatus can resume communicate with the initial electronic device efficiently. This achieves an advantageous effect that a transmission system with quick response in which electronic devices are connected to one host apparatus through a common data line, a method for controlling the system, a host apparatus and electronic devices constituting the transmission system can be realized.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

INDUSTRIAL AVAILABILITY

The present invention can apply to a host apparatus, electronic devices and transmission system in which communication between electronic devices and the host apparatus is executed. For example, the present invention can apply to the host apparatus capable of connecting to an IC card, an IC card and IC card system.

The invention claimed is:

1. A host apparatus comprising:
an input/output part having a command signal line for transmitting a command signal from the host apparatus to an electronic device and a response signal from said electronic device to the host apparatus in response to said command signal, and a data line, at least a part of which is commonly used by plural electronic devices and connected to the plural electronic devices, for transmitting, at least, data in connection with the command signal from the host apparatus to said electronic device; and
a control part having a saving register for bus release, wherein data is transmitted conforming to a protocol that the host apparatus serves as a master and said electronic devices serve as slaves, the host apparatus transmits a command signal to said electronic device and then said electronic device that received the command signal returns a response signal to the host apparatus and further, if necessary, data is transmitted from the host apparatus to the electronic device or from the electronic device to the host apparatus; and
said control part in the state where one of said electronic devices is executing the processing that occupies said data line, when data transmission between the host apparatus and the other one of said electronic devices is intended to be executed, transmits a command signal for releasing said data line and suspending said processing to the electronic device that occupies said data line through said command signal line;

stores an identifier of the electronic device that occupies said data line and the information on the current stage of said processing in said saving register for bus release;

after completion of data transmission between the host apparatus and said other electronic device, reads out the identifier of the electronic device that had occupied said data line and the information on the current stage of said processing from said saving register for bus release; and transmits a command signal for returning to said suspended processing to the electronic device that had occupied said data line through said command signal line.

2. A host apparatus comprising:

an input/output part having a command signal line for transmitting a command signal from the host apparatus to an electronic device and a response signal from said electronic device to the host apparatus in response to said command signal, and a data line, at least a part of which is commonly used by plural electronic devices and connected to the plural electronic devices, for transmitting, at least, data in connection with the command signal from the host apparatus to said electronic device; and a control part having a saving register for bus release, wherein data is transmitted conforming to a protocol that the host apparatus serves as a master and said electronic devices serve as slaves, the host apparatus transmits a command signal to said electronic device and then said electronic device that received the command signal returns a response signal to the host apparatus and further, if necessary, data is transmitted from the host apparatus to the electronic device or from the electronic device to the host apparatus; and said control part in the state where one of said electronic devices is executing the processing that occupies said data line, when data transmission between the host apparatus and the other one of said electronic devices is intended to be executed, transmits a command signal for releasing said data line and suspending said processing to said plural electronic devices connected to said data line through said command signal line;

stores information that said data line has been released and information on the current stage of said processing in said saving register for bus release;

after completion of data transmission between the host apparatus and said other electronic device, reads out the information that said data line has been released and the information on the current stage of said processing from said saving register for bus release; and transmits a command signal for returning to said suspended processing to said plural electronic devices connected to said data line through said command signal line.

3. A host apparatus in accordance with claim 1 or claim 2, wherein said input/output part further has an interrupt signal line for transmitting an interrupt signal from said electronic devices to the host apparatus;

said control part further has an interrupt priority determination part;

in the case where the host apparatus receives the interrupt signal for requesting data transmission from the other one of said electronic devices through said interrupt signal line in the state where one of said electronic devices is executing the processing that occupies said data line; and said interrupt priority determination part determines that said data transmission has a higher priority than the processing that occupies said data line, there is a case where data transmission between the host apparatus and said other electronic device is intended to be executed in the state where one of said electronic devices is executing the processing that occupies said data line.

4. An electronic device comprising:

an input/output part having a command signal line for transmitting a command signal from the host apparatus to an electronic device and a response signal from said electronic device to the host apparatus in response to said command signal, and a data line, at least a part of which is commonly used by plural electronic devices and connected to the plural electronic devices, for transmitting, at least, data in connection with the command signal from the host apparatus to said electronic device; and a control part having a saving register for bus release, wherein data is transmitted conforming to a protocol that said host apparatus serves as a master and the electronic devices serve as slaves, said host apparatus transmits a command signal to the electronic device and then the electronic device that received the command signal returns a response signal to the host apparatus and further, if necessary, data is transmitted from said host apparatus to the electronic device or from the electronic device to said host apparatus; and said control part in the state where the electronic device is executing the processing that occupies said data line, when receiving a command signal for releasing said data line and suspending said processing from said host apparatus, stores information on the current stage of said processing in said saving register for bus release, suspends said processing and transmits a response signal for notifying that said processing has been suspended and said data line has been released to said host apparatus through said command signal line;

when receiving a command signal for returning to said suspended processing from said host apparatus through said command signal line, transmits a response signal including information that return of said processing is possible and the information as to whether the data line needs to be reoccupied or not to said host apparatus through said command signal line, reads out the information on the current stage of said processing from said saving register for bus release, resumes said processing from said stage, and if there is need to reoccupy said data line, transmits data through said data line.

5. A method for controlling a transmission system comprising a host apparatus, plural electronic devices, a command signal line for transmitting a command signal from the host apparatus to an electronic device and a response signal from said electronic device to the host apparatus in response to said command signal, and a data line, at least a part of which is commonly used by plural electronic devices and connected to the plural electronic devices, for transmitting, at least, data in connection with the command signal from the host apparatus to said electronic device; data is transmitted conforming to a protocol that said host apparatus serves as a master and said electronic devices serve as slaves, said host apparatus transmits a command signal to said electronic device and then said electronic device that received the command signal returns a response signal to said host apparatus and further, if necessary, data is transmitted from said host apparatus to the electronic device or from the electronic device to said host apparatus, wherein said method comprises the steps of:

in the state where one of said plural electronic devices is executing the processing that occupies said data line, transmitting a command signal for releasing said data line and suspending said processing from the host apparatus to said electronic device that occupies said data line through said command signal line in order to execute data transmission between said host apparatus and the other one of said electronic devices;

transmitting a response signal for notifying that said processing has been suspended and said data line has been released from the electronic device that occupies said data line to said host apparatus through said command signal line;

after completion of data transmission between said host apparatus and said other electronic device, transmitting a command signal for returning to said suspended processing from the host apparatus to the electronic device that had occupied said data line through said command signal line;

transmitting a response signal including the information that return of said processing is possible and information as to whether the data line needs to be reoccupied or not from the electronic device that had occupied said data line to said host apparatus through said command signal line;

and if the electronic device that had occupied said data line need to reoccupy said data line, transmitting data through said data line and resuming said processing.

6. A method for controlling a transmission system comprising a host apparatus, plural electronic devices, a command signal line for transmitting a command signal from the host apparatus to an electronic device and a response signal from said electronic device to the host apparatus in response to said command signal, and a data line, at least a part of which is commonly used by plural electronic devices and connected to the plural electronic devices, for transmitting, at least, data in connection with the command signal from the host apparatus to said electronic device; data is transmitted conforming to a protocol that said host apparatus serves as a master and said electronic devices serve as slaves, said host apparatus transmits a command signal to said electronic device and then said electronic device that received the command signal returns a response signal to said host apparatus and further, if necessary, data is transmitted from said host apparatus to the electronic device or from the electronic device to said host apparatus, wherein said method comprises the steps of:

in the state where one of said plural electronic devices is executing the processing that occupies said data line, transmitting a command signal for releasing said data line and suspending said processing from the host apparatus to said plural electronic devices connected to said data line through said command signal line in order to execute data transmission between said host apparatus and the other one of said electronic devices;

transmitting a response signal for notifying that said processing has been suspended and said data line has been released from the electronic device that occupies said data line to said host apparatus through said command signal line;

after completion of data transmission between said host apparatus and said other electronic device, transmitting a command signal for returning to said suspended processing from the host apparatus to said plural electronic devices connected to said data line through said command signal line;

transmitting a response signal including information that return of said processing is possible and information as to whether the data line needs to be reoccupied or not from the electronic device that had occupied said data line to said host apparatus through said command signal line; and if the electronic device that had occupied said data line need to reoccupy said data line, transmitting data through said data line and resuming said processing.

7. A method for controlling a transmission system in accordance with claim 5 or claim 6, further comprising an interrupt signal line for transmitting an interrupt signal from said electronic device to the host apparatus, wherein said method comprises the steps of:

in the state where one of said electronic devices is executing the processing that occupies said data line, said host apparatus receiving an interrupt signal for requesting data transmission from the other one of said electronic devices through said interrupt signal line; and determining that said data transmission has a higher priority than the processing that occupies said data line; and based on the result of said determination, there is a case where data transmission between said host apparatus and said other electronic device is intended to be executed in the state wherein one of said electronic devices is executing the processing that occupies said data line.

8. A host apparatus comprising:

an input/output part having a communication line for transmitting a command signal from the host apparatus to an electronic device and a response signal from said electronic device to the host apparatus in response to said command signal; and a control part having a saving register, wherein data is transmitted conforming to a protocol that the host apparatus serves as a master and said electronic devices serve as slaves, the host apparatus transmits a command signal to said electronic device and then said electronic device that received the command signal returns a response signal to the host apparatus and further, if necessary, data is transmitted from the host apparatus to the electronic device or from the electronic device to the host apparatus; and said control part in the state of performing communication processing with one of said electronic devices, when the host apparatus intends to communicate with the other one of said electronic devices, transmits a command signal for suspending said communication processing to said electronic device through said communication line;

stores an identifier of said electronic device and information on the current stage of said communication processing in said saving register;

after completion of communication between the host apparatus and said other electronic device, reads out the identifier of said electronic device and the information on the current stage of said communication processing from said saving register; and transmits a command signal for returning to said suspended communication processing to said electronic device through said communication line.

9. A transmission system comprising: a host apparatus having a register for bus release; plural electronic devices, each having a register for bus release; a command signal line for transmitting a command signal from said host apparatus to said electronic device and a response signal from said electronic device to said host apparatus in response to said command signal; and a data line, via which said plural electronic devices are connected to said host apparatus and at least a part of which is commonly used by plural electronic devices for transmitting, at least, data in connection with the command signal from the host apparatus to said electronic device, wherein data is transmitted conforming to a protocol that said host apparatus serves as a master and said electronic devices serve as slaves, said host apparatus transmits a command signal to said electronic device and then said electronic device that received the command signal returns a response signal to said host apparatus and further, if necessary, data is transmitted from said host apparatus to the electronic device or from the electronic device to said host apparatus, wherein said host apparatus, in the state where one of said plural electronic devices is executing the processing that occupies said data line, transmits a command signal for releasing said data line and suspending said processing to said electronic device that occupies said data line through said command signal line so that data transmission is executed between said host apparatus and the other one of said electronic devices, and stores information that said data line has been released and information on the current stage of said processing in said register for bus release;

said electronic device that has occupied said data line transmits a response signal informing that said processing is suspended and said data line is released to said host apparatus through said command signal line, and stores the information that said data line is released and the information on the current stage of said processing in said register for bus release;

after completion of data transmission between said host apparatus and said other electronic device, said suspended processing between said host apparatus and the electronic device that had occupied said data line is made return, and said processing is resumed from the suspended stage based on the information read out from said register for bus release respectively.

* * * * *